United States Patent
Youmans et al.

(10) Patent No.: US 9,981,379 B1
(45) Date of Patent: May 29, 2018

(54) DETACHABLE SUPPORT MEMBER FOR ROBOT GRIPPER

(71) Applicant: X Development LLC, Mountain View, CA (US)

(72) Inventors: David Youmans, San Francisco, CA (US); Marc Strauss, Fremont, CA (US)

(73) Assignee: X Development LLC, Mountain View, CA (US)

( * ) Notice: Subject to any disclaimer, the term of this patent is extended or adjusted under 35 U.S.C. 154(b) by 86 days.

(21) Appl. No.: 15/153,694

(22) Filed: May 12, 2016

(51) Int. Cl.
  *B25J 15/00* (2006.01)
  *B25J 9/16* (2006.01)

(52) U.S. Cl.
  CPC ......... *B25J 9/1612* (2013.01); *B25J 15/0028* (2013.01)

(58) Field of Classification Search
  None
  See application file for complete search history.

(56) References Cited

U.S. PATENT DOCUMENTS

| 4,699,414 A | 10/1987 | Jones |
| 4,863,206 A | 9/1989 | Kaufmann |
| 6,015,174 A | 1/2000 | Raes et al. |
| 9,333,649 B1* | 5/2016 | Bradski ............... B25J 9/163 |
| 2004/0245072 A1* | 12/2004 | Nagler ............... B25J 9/0093 198/468.2 |
| 2006/0084363 A1 | 4/2006 | Carlson, III |
| 2006/0182603 A1 | 8/2006 | Hawes |
| 2015/0124056 A1* | 5/2015 | Ando ............... B25J 9/1612 348/46 |
| 2016/0221196 A1* | 8/2016 | Suzuki ............... B25J 15/0475 |
| 2016/0288322 A1* | 10/2016 | Lin ............... B25J 9/163 |
| 2017/0014995 A1* | 1/2017 | Kato ............... B25J 13/085 |

* cited by examiner

*Primary Examiner* — Ryan Rink
(74) *Attorney, Agent, or Firm* — McDonnell Boehnen Hulbert & Berghoff LLP

(57) ABSTRACT

An example robotic gripping device includes two opposable gripping fingers and at least one actuator configured to move the two opposable gripping fingers towards and away from each other within a plane of motion. The robotic gripping device further includes a gripper base coupled to the two opposable gripping fingers, where the gripper base comprises an attachment interface. The robotic gripping device further includes a detachable elongated support member that mates with the attachment interface of the gripper base, such that when the elongated support member is attached to the attachment interface of the gripper base, the elongated support member extends parallel to the plane of motion of the two opposable gripping fingers.

22 Claims, 10 Drawing Sheets

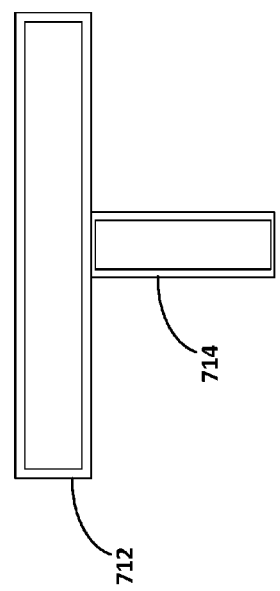
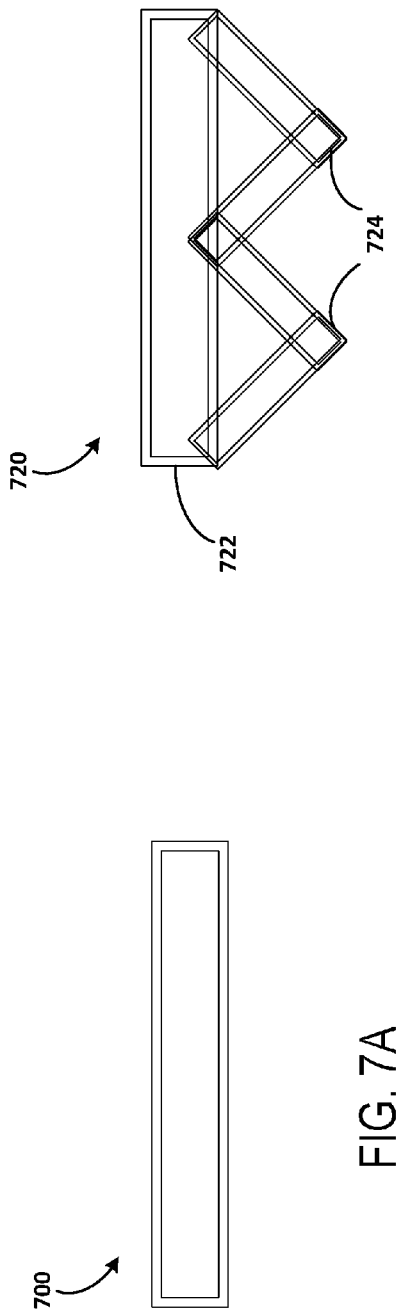

DETACHABLE SUPPORT MEMBER FOR ROBOT GRIPPER

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be efficient. Therefore, a demand for efficient robotic systems has helped open up a field of innovation in actuators, movement, sensing techniques, as well as component design and assembly.

Robotic devices, such as robotic legs and arms, may include various components or attachments that are designed to interact with the environment. Such components may include robotic feet and hands, which may include additional components that can be used to support, stabilize, grip, and otherwise allow a robotic device to effectively carry out one or more actions.

In particular, robotic arms may include one or more "end effectors" that interact with the environment. For example, end effectors may be impactive (such as a claw), ingressive (such as a pin or needle), astrictive (such as a vacuum or suction element) or contigutive (requiring contact for adhesion, such as glue).

SUMMARY

Example embodiments relate to a detachable elongated support member for a robotic gripping device. A robotic gripping device may include two fingers, arranged opposite each other, that may be actuated to grasp an object. In some embodiments, an elongated support member may be attached to a gripper base of the gripping device in order to support the grasping and/or moving of certain types of objects. When the support member is attached, it may extend under the fingers of the gripping device parallel to the plane of motion of the fingers as they move towards each other to grasp an object. The support member may in some cases prevent a grasped object from rotating between the fingers of the gripping device.

In one example, a robotic gripping device is disclosed, including two opposable gripping fingers. The gripping device further includes at least one actuator configured to move the two opposable gripping fingers towards and away from each other within a plane of motion. The gripping device additionally includes a gripper base coupled to the two opposable gripping fingers, where the gripper base comprises an attachment interface. The gripping device also includes a detachable elongated support member that mates with the attachment interface of the gripper base, where when the elongated support member is attached to the attachment interface of the gripper base, the elongated support member extends parallel to the plane of motion of the two opposable gripping fingers.

In another example, a method is described. The method involves identifying an object for a robotic gripping device to grasp, where the robotic gripping device comprises two opposable gripping fingers that are configured to move towards and away from each other within a plane of motion. The method further includes determining, based on one or more characteristics of the identified object, to attach an elongated support member to an attachment interface on a gripper base of the robotic gripping device before grasping the identified object. The method also includes causing the robotic gripping device to attach the elongated support member to the attachment interface on the gripper base of the robotic gripping device, where the attached elongated support member extends parallel to the plane of motion of the two opposable gripping fingers. The method additionally includes positioning the robotic gripping device such that the identified object is between the two opposable gripping fingers and the elongated support member is beneath the identified object. After positioning the robotic gripping device, the method further includes actuating the two opposable gripping fingers to grasp the identified object.

In a third example, a robot is disclosed that includes a gripping device and a control system. The gripping device includes two opposable gripping fingers. The gripping device further includes at least one actuator configured to move the two opposable gripping fingers towards and away from each other within a plane of motion. The gripping device additionally includes a gripper base coupled to the two opposable gripping fingers, where the gripper base comprises an attachment interface. The gripping device also includes a detachable elongated support member that mates with the attachment interface of the gripper base, where when the elongated support member is attached to the attachment interface of the gripper base, the elongated support member extends parallel to the plane of motion of the two opposable gripping fingers. The control system is configured to identify an object for the gripping device of the robot to grasp. The control system is further configured to determine, based on one or more characteristics of the identified object, to attach the elongated support member to the attachment interface on the gripper base of the gripping device before grasping the identified object. The control system is additionally configured to cause the robot to attach the elongated support member to the attachment interface on the gripper base of the gripping device. The control system is additionally configured to cause the robot to position the gripping device such that the object is between the two opposable gripping fingers and the elongated support member is beneath the object. The control system is further configured to actuate the two opposable gripping fingers to grasp the identified object.

In another example, a system is described that includes means for identifying an object for a robotic gripping device to grasp, where the robotic gripping device comprises two opposable gripping fingers that are configured to move towards and away from each other within a plane of motion. The system further includes means for determining, based on one or more characteristics of the identified object, to attach an elongated support member to an attachment interface on a gripper base of the robotic gripping device before grasping the identified object. The system also includes means for causing the robotic gripping device to attach the elongated support member to the attachment interface on the gripper base of the robotic gripping device, where the attached elongated support member extends parallel to the plane of motion of the two opposable gripping fingers. The system additionally includes means for positioning the robotic gripping device such that the identified object is between the two opposable gripping fingers and the elongated support member is beneath the identified object. After positioning the robotic gripping device, the system further includes means for actuating the two opposable gripping fingers to grasp the identified object.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE FIGURES

FIGS. 7A, 7B, and 7C illustrate example support member shapes, according to example embodiment.

DETAILED DESCRIPTION

Figure 1:
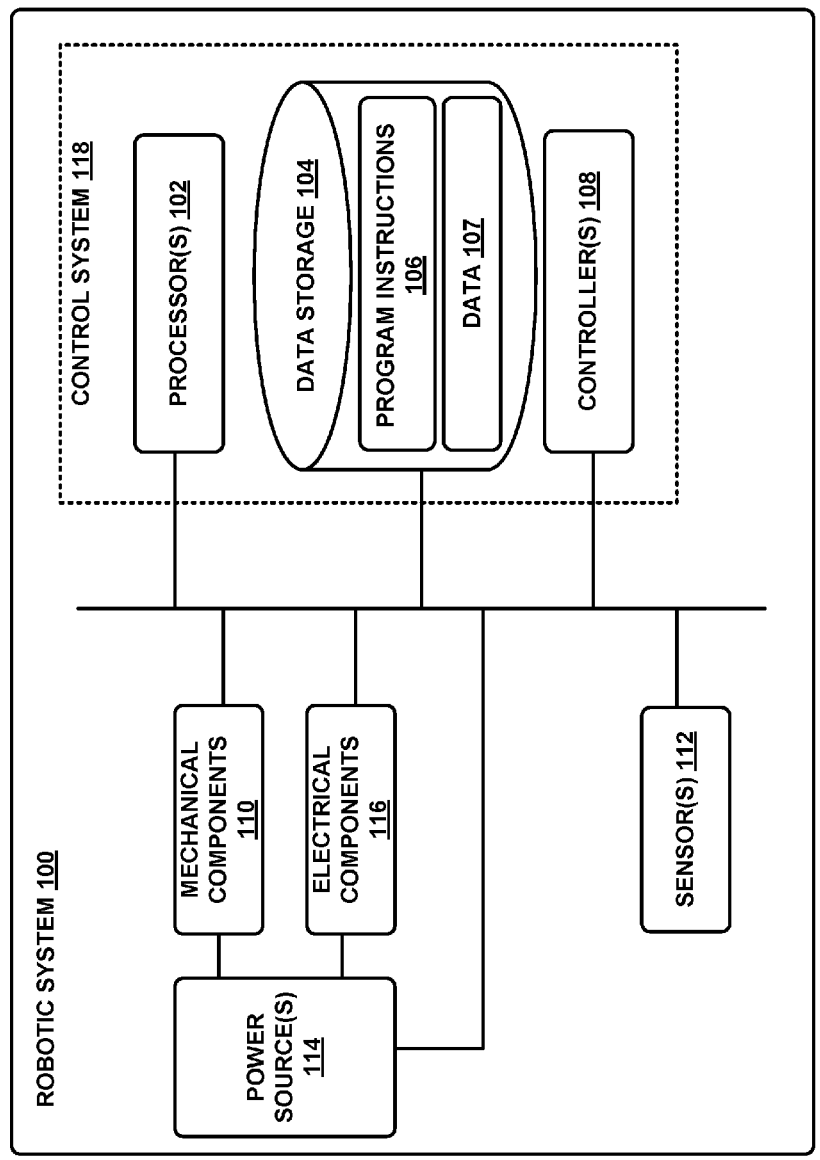
FIG. 1 illustrates an example configuration of a robotic system, according to an example embodiment.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

As noted above, robotic arms may include many different types of end effectors. One often used type of end effector is a gripper, which allows a robotic arm to grip or grasp an object. Many grippers include two opposable fingers that act to grasp an object in a pincer-like manner. This type of gripper may encounter difficulty in grasping certain types of objects. For example, a relatively large and heavy object like a textbook may rotate when held by the gripper because the weight of the textbook may be centered well in front of the gripper when the two fingers of the gripper clamp down on the back and front cover of the book. In some example embodiments, a support piece may be attached to a gripper base by a robot to facilitate gripping objects of this nature.

More specifically, a robot gripper may include two or more opposing fingers that are actuated to move towards and away from each other within a plane of motion. For instance, an actuator coupled to the base of each of the fingers may be configured to move the fingers toward and away from each other in a pincer-like manner, such that the fingers rotate about respective axes. In particular, the actuator may be configured to move the fingers such that an angle created by the fingers increases and/or decreases. In other examples, movement of the fingers may include translational movement along an axis, such as movement in a clamping or sliding manner. The fingers may be coupled to one or more components of the robotic gripping device in a manner that allows them to maintain their orientation with respect to the gripping device (e.g., without rotating). In yet other examples, the movement of the fingers may consist of a combination of rotation and translation.

The fingers of the gripping device may be connected to a gripper base. The gripper base is a component that has a fixed position relative to the gripping device. In some cases, the fingers may be connected to the gripper base through one or more additional components. The gripper base may include an attachment interface capable of mating with an elongated support member. The attachment interface may be arranged on the gripper base so that when the support member is attached to the gripper base, the support member extends parallel to the plane of motion of the gripping fingers. For instance, when the gripper is oriented so that the gripping fingers move together and apart within a flat horizontal plane, the support member may extend along a plane below the plane of motion of the fingers. When the fingers of the gripper grasp a large object like a textbook, the support member may prevent object from rotating or slipping between the gripper fingers. In some examples, the support member may allow for the use of a gripper that applies less torque with the fingers. For instance, the fingers may only need to create enough torque to balance a textbook on the support member, as opposed to creating enough friction to prevent the textbook from rotating or sliding out of the grasp of the fingers. The support member may therefore allow for the use of a smaller and/or less expensive actuator for the gripper.

The detachable support member may have various forms and shapes. The support member may have an elongated shape such that its length may be substantially greater than its width. This shape allows the support member to extend from the gripper base beyond the fingers without unnecessarily obstructing movement of the gripper. In some examples, the support member may include a single flat planar surface that allows the support member to be slid into tight spaces (e.g., under an object or between objects). In another example, the support member may additionally include a perpendicular plate underneath that acts as a shear wall to allow the support member to support heavier objects. In a further example, the support member may have one or more triangle shapes or other shapes underneath for extra support. A robot may also be equipped with multiple support members with different shapes that each may be attached to the gripper base for manipulating different types of objects.

The attachment interface on the gripper base may also have various forms for mating with a detachable support member. In one example, the attachment interface may be a hook which passes through an opening in the support member. The support member may then have a cylindrical rod such as a dowel pin which fits within the hook. The weight of the support member may pivot and drive up into the gripper base so that the support member stays in place when the gripping device is oriented horizontally. The gripper base may additionally include a magnet that mates with a metal portion of the support member to hold the support member in place when the gripper is moved through different orientations. In another embodiment, the attachment interface on the gripper base may be a pocket with a detent latch that fits into a detent recess on the support member when the support member is inserted into the pocket. Other types of attachment interfaces may also be used.

A robot may include a control system that determines when to attach the support member to the gripper base. In some examples, the control system may determine to attach the support member based on one or more properties of an object to be grasped, such as size, weight, or center of mass. These properties may be estimated or predicted based on optical sensor data or other types of sensor data. In other cases, these properties may be determined from past interactions with the object or similar types of objects. For instance, the robot may be commanded to pick up the object with the gripper. If the robot determines that the object is rotating or slipping between the fingers, the robot may be commanded to put the object back down, attach the support member to gripper base, and then pick up the object again. Other more complex tasks or sequences of operations may be performed by the robot using the gripper and attached support member as well.

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, preshaper components, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, positioning, or rotation of the actuators on arms, legs, hands, feet, fingers, preshaper components, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
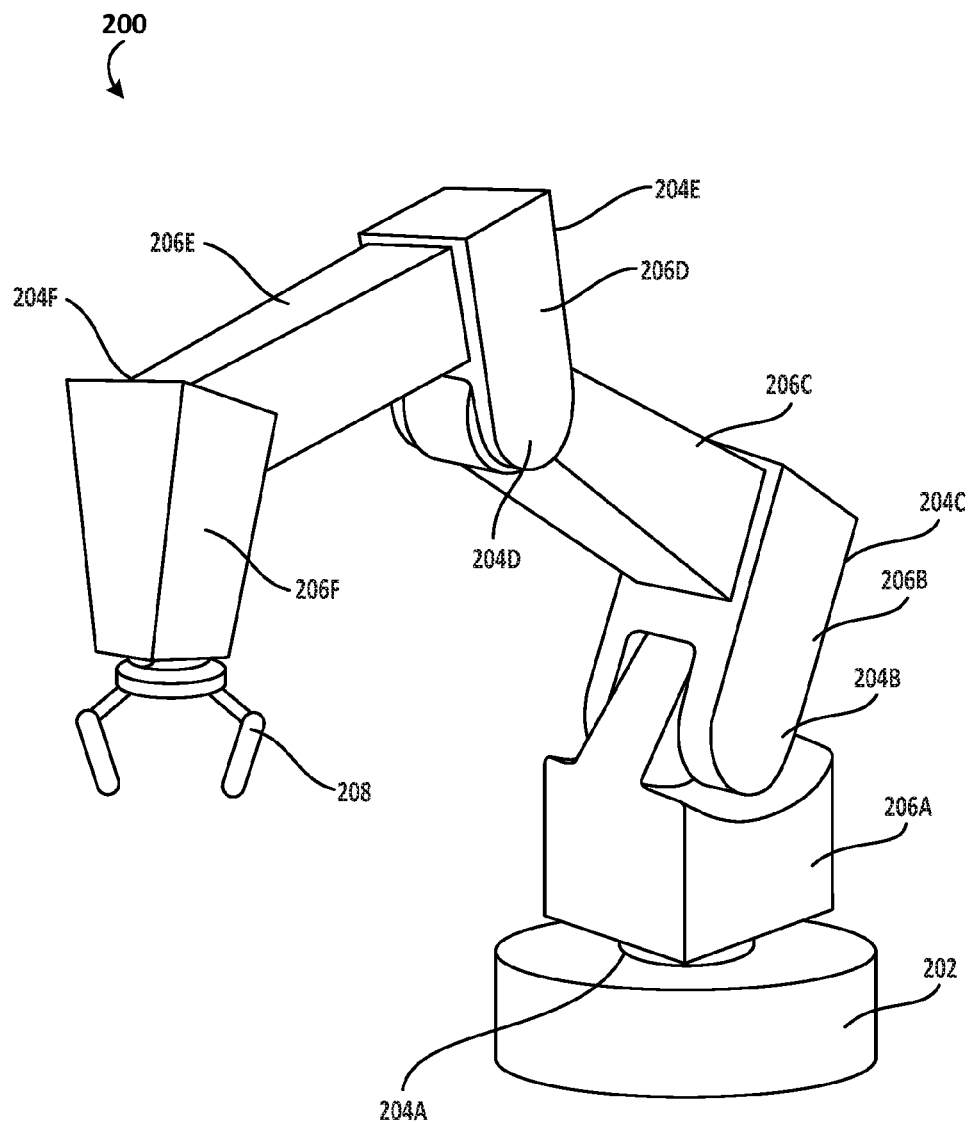
FIG. 2 illustrates an example robotic arm, according to an example embodiment.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. The actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

Figure 3:
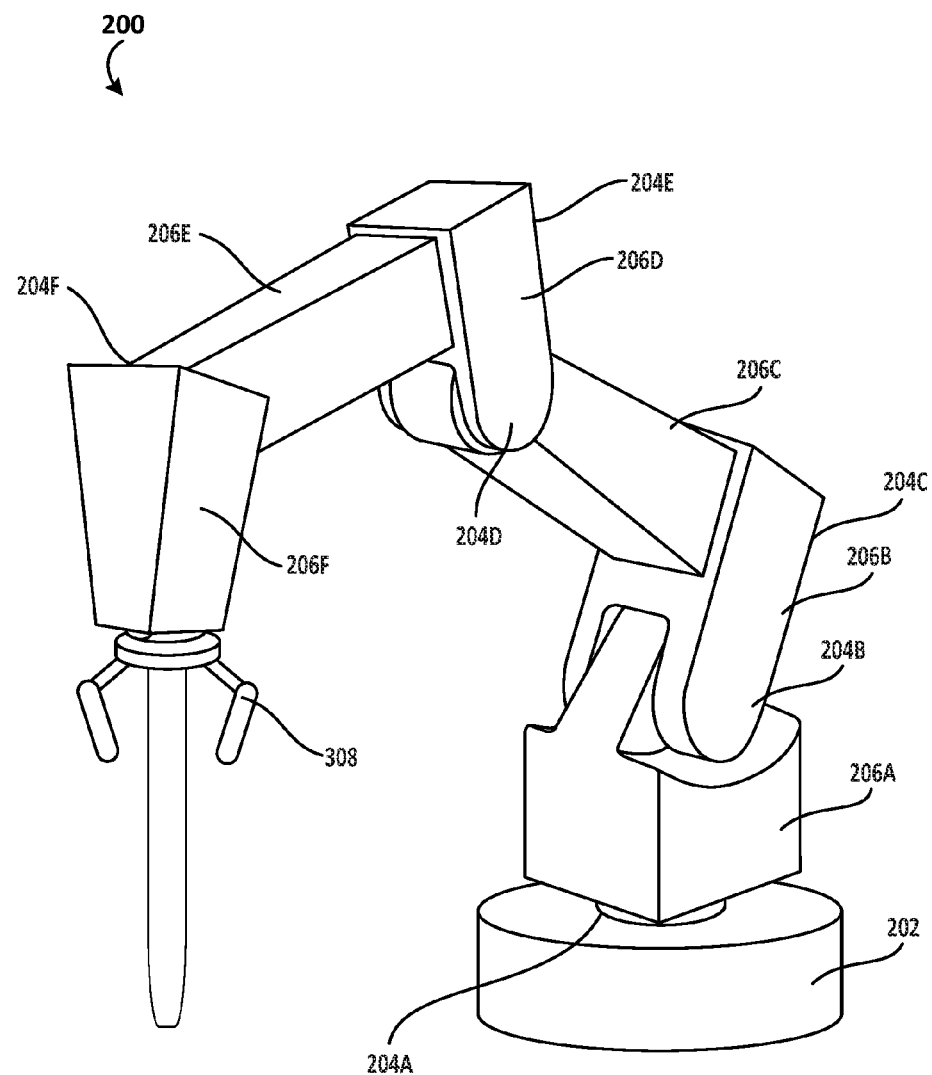
FIG. 3 illustrates an example robotic arm with an example gripping device, according to an example embodiment.

FIG. 3 shows the example robotic arm 200 with a robotic gripping device 308 that includes an elongated support member. Robotic gripping device 308 may be similar or identical to robotic gripping device 600 described in more detail below with reference to FIGS. 6A-6B.

Figure 4A:
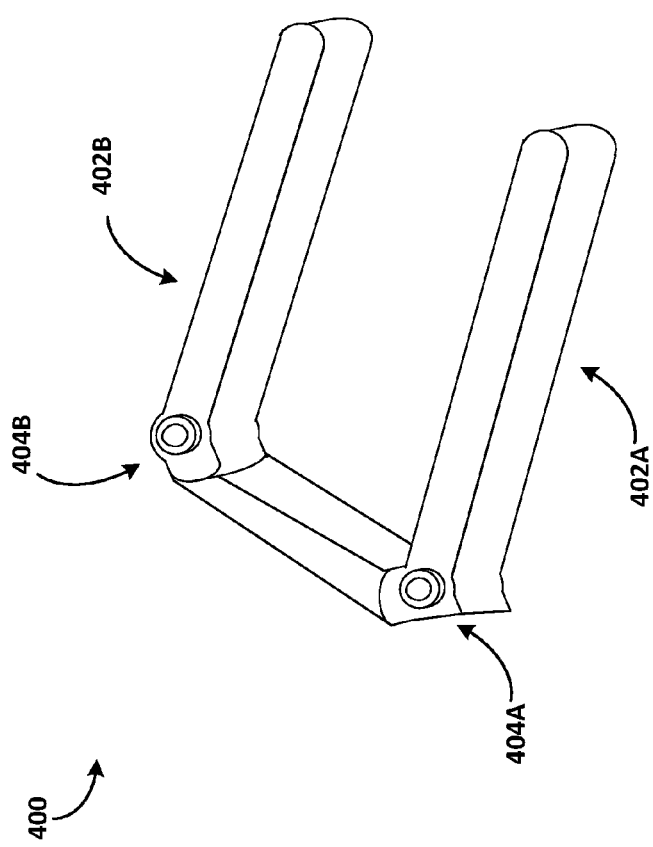
FIG. 4A illustrates an example robotic gripping device, according to an example embodiment.

FIG. 4A illustrates an example robotic gripping device 400 according to an example implementation. Robotic gripping device 400 may be implemented as a mechanical component of system 100, and/or robot arm 200. Although the components illustrated in FIG. 4A are shown with a certain orientation and/or design, it should be understood that one or more components of robotic gripping device 400 may be removed, added, and/or modified while remaining within the scope of this disclosure. Also, the orientation and combination of components may be changed based on the desired implementation.

Robotic gripping device 400 may include one or more physical components, including fingers 402A-B and rotational joints 404A-B. In some examples, robotic gripping device 400 may include two opposable fingers, as shown in FIG. 4A. In other examples, more or fewer fingers may be included. For instance, where three or more fingers are included, the fingers may be arranged in two groups opposing each other, such that when they are actuated they close toward each other. Two fingers may be positioned opposite the third, such that when the fingers close they interlock.

In some examples, fingers 402A-B may be underactuated fingers. Fingers 402A-B may have a structure such that each phalanx is not actuated independently, but the full finger is actuated at the same time, and/or actuated by a single actuator or movement. A phalanx is a section of a finger. As an example, a typical human index finger includes three phalanges.

Each finger 402A-B may include one or more gripping surfaces. In some examples, each finger 402A-B may be an underactuated finger with a deformable gripping surface, which may be a flexible plastic, rubber, or other material suitable for gripping an object. In some examples, each gripping surface may be a single or unitary component. In other examples, each gripping surface may include a plurality of members coupled together end-to-end. The plurality of members may be rotatably coupled together by joints, such as pin joints, rolling joints, or circular joints, for example. Further, each gripping surface may be configured to be generally straight under normal circumstances, such as when no pressure or force is applied to the surface and the finger is in a normal operating state. In other examples, each gripping surface may be configured to have a bend or curve under normal circumstances (i.e., a biased shape), such that when no pressure or force is applied to the gripping surface it is curved or bent nonetheless.

Each finger 402A-B may have a proximal end that is used to couple the finger to one or more actuators that move the finger. For instance, an actuator may rotate finger 402A about rotational joint 404A and may rotate finger 402B about rotational joint 404B. In some examples, a separate actuator may rotate each finger 402A-B. In other examples, a single actuator may operate both fingers 402A and 402B.

In some examples, the fingers 402A-B may each rotate within the same plane of motion about a respective parallel axis. The plane of motion includes the points that the gripping surfaces of the fingers 402A-B move through as the actuators rotate the fingers 402A-B from an open state to a closed state. In other examples, the actuators may cause the gripping surfaces of the fingers 402A-B to translate towards and away from each other within a plane of motion instead or in addition to rotation.

Figure 4B:
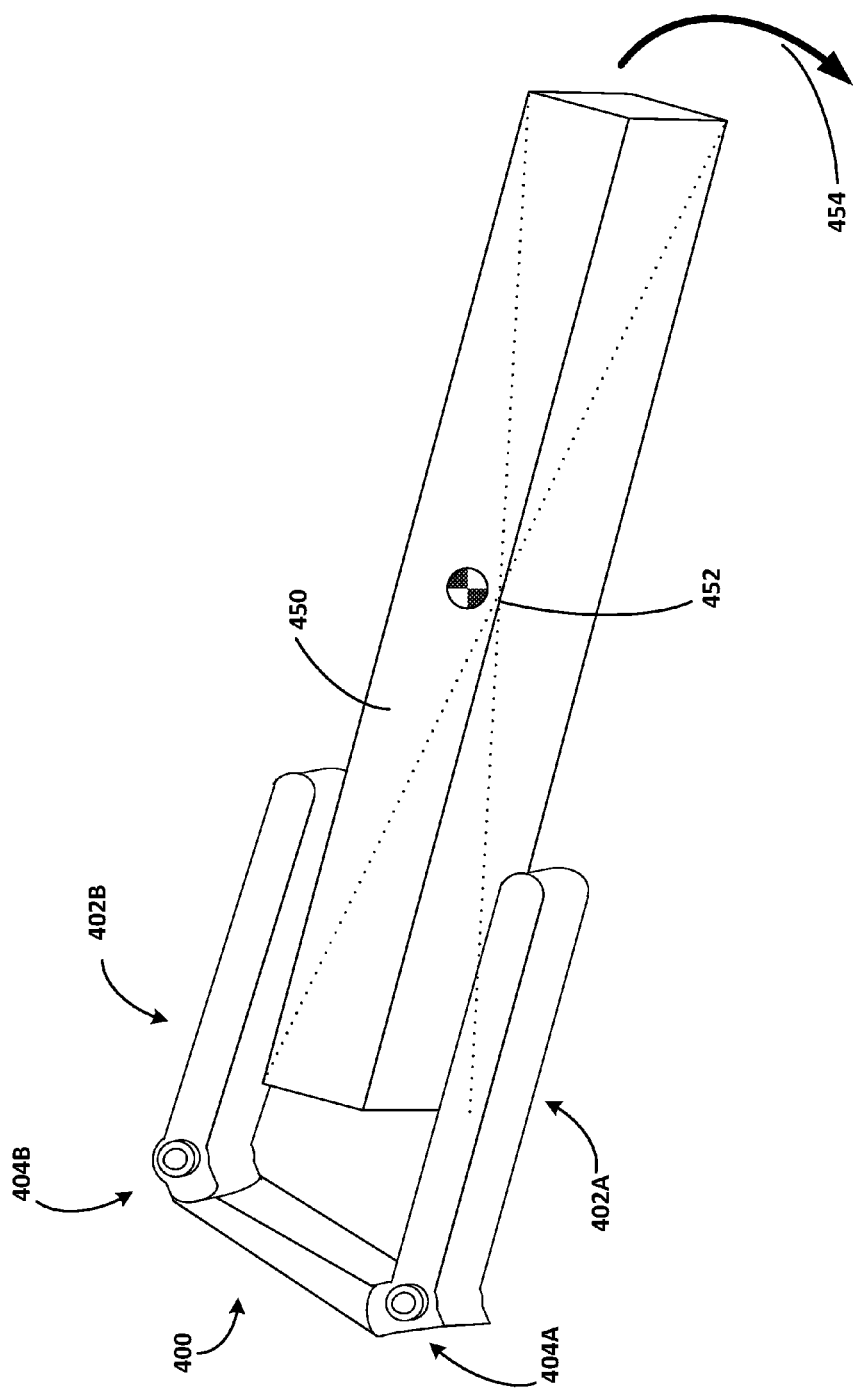
FIG. 4B illustrates the example robotic gripping device of FIG. 4A gripping an object, according to an example embodiment.

FIG. 4B illustrates the gripping device 400 of FIG. 4A grasping an object, according to an example embodiment. More specifically, the actuators may be controlled to rotate the fingers 402A-B towards each other about rotational joints 404A-B in order to cause the gripping surfaces of the fingers 402A-B to contact object 450. In some cases, the gripping surfaces of fingers 402A-B may conform to the shape of the object 450 as the actuators continue to move the fingers 402A-B closer together.

Certain objects such as books or shoe boxes may have a size and shape that makes it difficult for the gripping device 400 to grasp the objects. In particular, the object 450 may have a center of mass 452 that is positioned well in front of the fingers 402A-B when the fingers 402A-B grasp the object 450. Because of the size and shape of the object 450, it may not be possible for the fingers 402A-B to grasp the object 450 such that the center of mass 452 of the object is between the fingers 402A-B. As a result, the object 450 may rotate or slip between the fingers 402A-B after the object 450 is grasped or when the object 450 is subsequently moved by the gripper 400. For instance, if the gripping device 400 is oriented so that the plane of motion of the fingers 402A-B is a horizontal plane, then the end of the object 450 that is furthest from the gripping device 400 may rotate or slip downward, as shown by arrow 454. In some cases, it may not be possible for the fingers 402A-B to apply enough force or torque to prevent the object 450 from rotating or slipping, or to do so without risking damage to the object 450.

Figure 5:
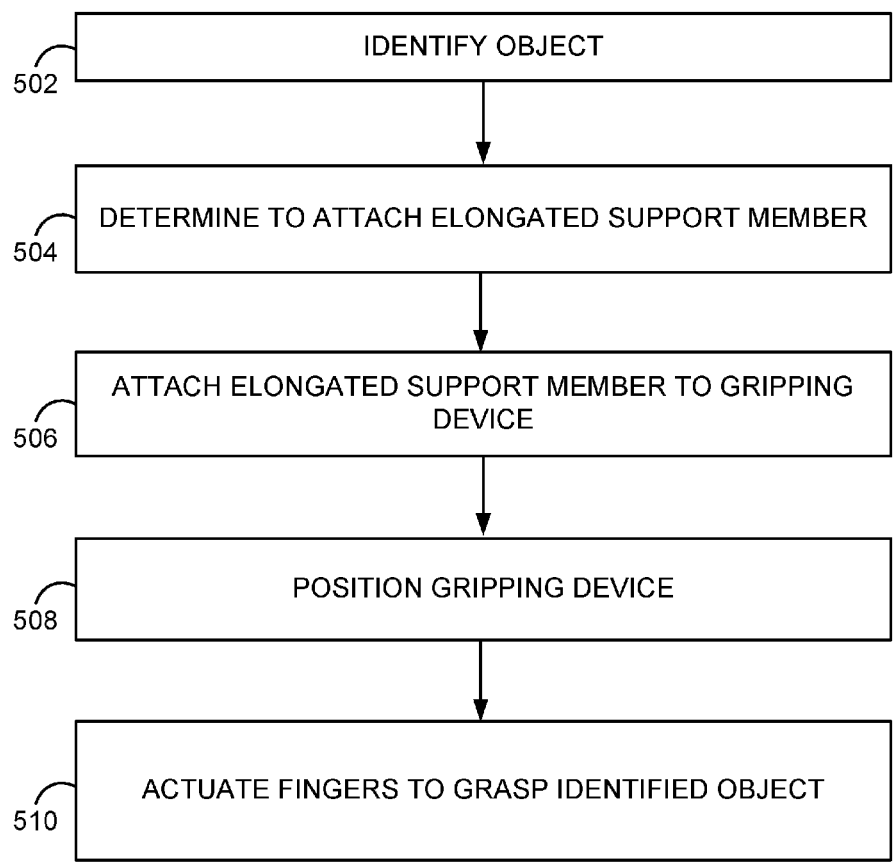
FIG. 5 is a block diagram of an example method, according to an example embodiment.

FIG. 5 is a block diagram of an example method 500, according to an example embodiment. The blocks of method 500 may be carried out by a control system of a robotic device that employs a robotic gripping device such as robotic gripping device 400 illustrated FIGS. 4A-B, but may also be applied to robots with other gripping devices having different arrangements of fingers or other components, and/or different types of components. Further, part or all of method 500 may be carried out by a local control of a robotic device, such as control system 118 illustrated in FIG. 1. In additional examples, part or all of method 500 may be carried out by a remote control system of a robotic device.

Furthermore, it is noted that the functionality described in connection with the flowcharts described herein can be implemented as special-function and/or configured general-function hardware modules, portions of program code executed by a processor for achieving specific logical functions, determinations, and/or steps described in connection with the flowchart shown in FIG. 5. Where used, program code can be stored on any type of computer-readable medium, for example, such as a storage device including a disk or hard drive.

In addition, each block of the flowchart shown in FIG. 5 may represent circuitry that is wired to perform the specific logical functions in the process. Unless specifically indicated, functions in the flowchart shown in FIG. 5 may be executed out of order from that shown or described, including substantially concurrent execution of separately described functions, or even in reverse order in some examples, depending on the functionality involved, so long as the overall functionality of the described method is maintained.

At block 502, method 500 may include identifying an object for a robotic gripping device to grasp, grip, pinch, grab, or hold. In some examples, identifying the object may include selecting an object based on its shape, orientation, profile, size, or another characteristic. In other examples, the object may be identified by a remote operator and/or computing system coupled to the robotic gripping device. The determination may be made based on received sensor data from one or more sensors, such as a visual sensor, touch sensor, pressure sensor, force-torque sensor, or other sensor, for example.

In some examples, an object such as a heavy book or a laptop computer may be identified. In such cases, it may be difficult for the robotic gripping device to grab, hold, and move the object without the object rotating or otherwise slipping within the robot's grip.

At block 504, method 500 may include determining to attach an elongated support member to the gripper base of the robot. In some examples, this determination may be based on one or more characteristics of the identified object. For instance, where the identified object is a relatively large and heavy object, the support member may be attached before gripping the object.

In some examples, the elongated support member is an unactuated component having a length that is substantially greater than its width. The support member may be detachable such that it may be attached to a gripping device in order to grip and move an object, and then subsequently removed from the gripping device by the robot. When not attached to the gripping device, the support member may be stored on the robot or within reach of the robot.

Some characteristics of the object used in the determination to attach a support member may include the size, shape, profile view, dimensions, weight, material, plasticity, location relative to other objects, or another characteristic. In making the determination, a characteristic may refer to a single characteristic, or may refer to one or more characteristics combined together to determine to attach the support member. For example, multiple views of an object may be combined to determine that a support member should be attached before grasping the object with the fingers.

In one example, the shape of the object may first be identified. A center of mass of the object may be estimated based on the shape of the object. In some cases, it may then be determined that the center of mass of the object is expected to extend beyond the opposable gripping fingers by more than the threshold distance (e.g., when the object is large and rectangular). When the center of mass of the object is expected to extend beyond the fingers by more than the threshold distance, the support member may be attached before grasping the object.

In further examples, a control system may also include instructions to attach the elongated support member to grasp an object with a center of mass that is near the tips of the gripper fingers, but not beyond the tips of the fingers. For instance, the control system may determine whether the center of mass of an object is expected to be located within a threshold distance of the distal end of the fingers (e.g., the fingertips) when the object is grasped. If so, then the support member may be attached before grasping the object.

In some examples, the determination to attach the support member may be made prior to grasping the identified object. For instance, image data of the object may be used to determine whether or not to attach the support member. In additional examples, past interactions with the object or a similar type of object may be used to determine whether or not to attach the support member. For instance, a control system of the robot may determine to attach the support member because similar types of objects have rotated or otherwise slipped or moved when gripped by the gripper fingers in the past.

In another example, the robot may first be controlled to pick up an object with the gripping fingers before attaching the support member. After grasping the object, the robot may determine that the object is rotating or slipping within the grip of the fingers (e.g., based on tactile or visual sensors). The robot may then be commanded to set the object back down by releasing the finger grip, move the gripping device to attach the support member to the gripper base, and then return the gripping device to pick up the object with the support member attached.

In some examples, determining to attach the support member to the gripper base of the robot may include selecting the support member from a plurality of different support members. The plurality of support members may each be coupled to the robot (e.g., at the base of the robot) and may have different characteristics, such as different shapes, sizes, and materials. The different support members may be used by the robot for different purposes. For instance, a first support member may be thicker and stronger than a second support member. The first support member may be selected to support the gripping of heavier objects. By contrast, the second support member may be selected when the support member must be slid under an object resting flat on another surface. Other variations of support members are described in more detail below.

At block 506, method 500 may include attaching the elongated support member to the gripping device. More specifically, the support member may be attached to the gripper base of the robot so that it extends parallel to the plane of motion of the fingers. In some examples, the support member mates with the attachment interface such the support member is tightly secured to the gripper base (e.g., with little or no relative motion between the support member and gripper base when the gripping device operates). In some cases, the support member may be offset by a distance perpendicular to the plane of motion of the fingers (e.g., by an inch or a foot). In another example, the support member may touch or nearly touch the bottom edges of the opposable fingers when the fingers move towards and away from each other. The support member may be positioned between the fingers of the robotic gripping device on an axis that bisects an angle between the fingers. For example, the axis may be a center line of the robotic gripping device. The center line may be chosen so that the weight of an object may be balanced over the support member when the fingers are actuated to the grip the object.

Figure 6A:
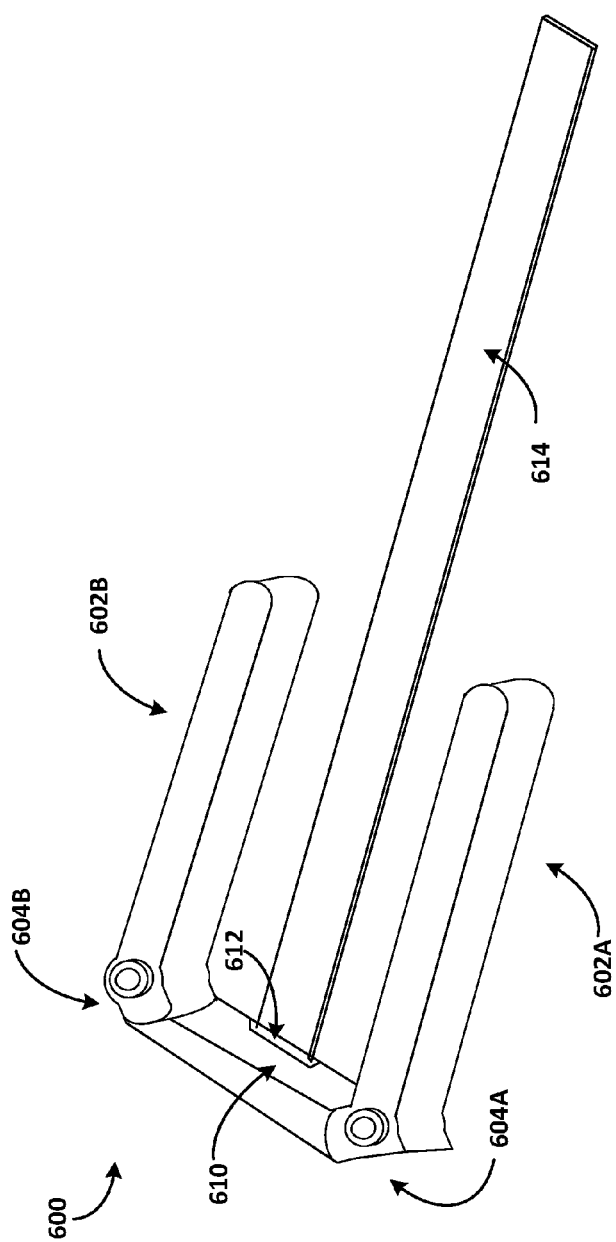
FIG. 6A illustrates an example robotic gripping device with an attached support member, according to an example embodiment.

FIG. 6A illustrates a robotic gripping device with an attached support member, according to an example embodiment. More specifically, gripping device 600 includes opposable fingers 602A-B that are moved within a plane of motion by one or more actuators which rotate the fingers 602A-B about respective parallel axes 604A-B. The fingers 602A-B include opposing gripping surfaces in order to grasp an object between the fingers 602A-B. The fingers 602A-B are coupled to gripper base 610. The gripper base 610 is a component that is fixed relative to gripping device 610. In some examples, the gripping device 600 may be coupled to a robot arm through a wrist joint that is configured to rotate the gripping device 600. In such examples, when the wrist joint rotates the gripping device 600, the gripper base 610 maintains the same relative position to the gripping device 600 and to fingers 602A-B. Accordingly, a robot may be able to position gripping device 600 with one or more degrees of freedom without affecting the relative positioning of gripper base 610 and fingers 602A-B.

The gripper base 610 may include an attachment interface 612 to which an elongated support member 614 may be attached, as shown in FIG. 6A. In some examples, the attachment interface 612 is a coupling mechanism located in or on the gripper base 610 to which a support member may be securely attached. The attachment interface 612 may be arranged on the gripper base 610 so that the support member 614 extends parallel to the plane of motion of fingers 602A-B. For instance, if the gripping device 600 is oriented so that the fingers 602A-B move towards and away from each other in a horizontal plane, the support member 614 may extend horizontally below the plane of motion of fingers 602A-B.

The support member 614 may include a flat planar surface that extends parallel to the plane of motion of fingers 602A-B (e.g., to support an object grasped between the fingers). Additionally, the support member 614 may be positioned laterally when attached to attachment interface 612 of gripper base 610 so that the longest dimension of the support member 614 bisects an angle between fingers 602A-B. The support member 614 may then extend beyond the area between the fingers in order to support larger objects.

In some examples, attaching the support member 614 to the attachment interface 612 of gripper base 610 may involve one or more movements of the gripping device 600. For instance, if the support member 614 is stored at a base of a robot, the gripping device 600 may be moved by a robotic arm from a first position to a second position near the base of the robot in order to click the support member 614 into the attachment interface 612 of the gripper base 610. The gripping device 600 may then be moved back to the first position with the support member 614 attached (e.g., to pick up an object). In practice, a predetermined set of movements may be followed by a robotic arm to attach a support member. When not attached to the gripper base 610, the support member 614 may be stored at another location on the robot or within reach of the robot.

Referring back to FIG. 5, at block 508, method 500 may include positioning the gripping device with the attached support member. More specifically, the gripping device may be positioned so that the support member can provide support in order to grip and move the object. In one example, the gripping device may be oriented so that the fingers move within a horizontal plane of motion, and at least a portion of an object is between the fingers. Additionally, the support member may extend horizontally beneath part or all of the object.

In some cases, the gripping device may be oriented so that the support member is in contact with the bottom of the object before the fingers grip the object (e.g., when the support member is slid between the object and a surface on which the object is resting). In other cases, the gripping device may be oriented so that the support member extends horizontally below the object with some amount of separation between the bottom of the object and the support member before the fingers grip the object. In such cases, the support member may act only as a failsafe in case the grip of the fingers slips, and the support member may never contact the object during the gripping and moving of the object.

In other examples, the gripping device may be oriented such that the fingers are actuated to move in a plane other than a horizontal plane. In such an example, the gripping device may be reoriented after the fingers grip an object so that the support member extends underneath the object to provide support for the object.

In further examples, the gripping device may be oriented so that support member may provide support for gripping and moving an object through a trajectory. For instance, the support member may extend along the right side of an object when the object is moved to the left so that the support member can prevent the fingers of the gripper from losing a tight grip on the object due to the motion of the object through the trajectory. Other positionings of the support member to support gripping and/or moving an object are also possible.

At block 510, method 500 may include actuating the fingers to grasp the identified object. In some examples, the fingers may be actuated to move in a horizontal plane to grasp opposing sides of an object while the support member is in place below the object. The fingers may grasp a first portion of the object, and the support member may extend below the first portion and an additional second portion of the object. The support member may then help to prevent the object from rotating within the grasp of the fingers when the support member extends past the point of contact between the fingers and the object.

Figure 6B:
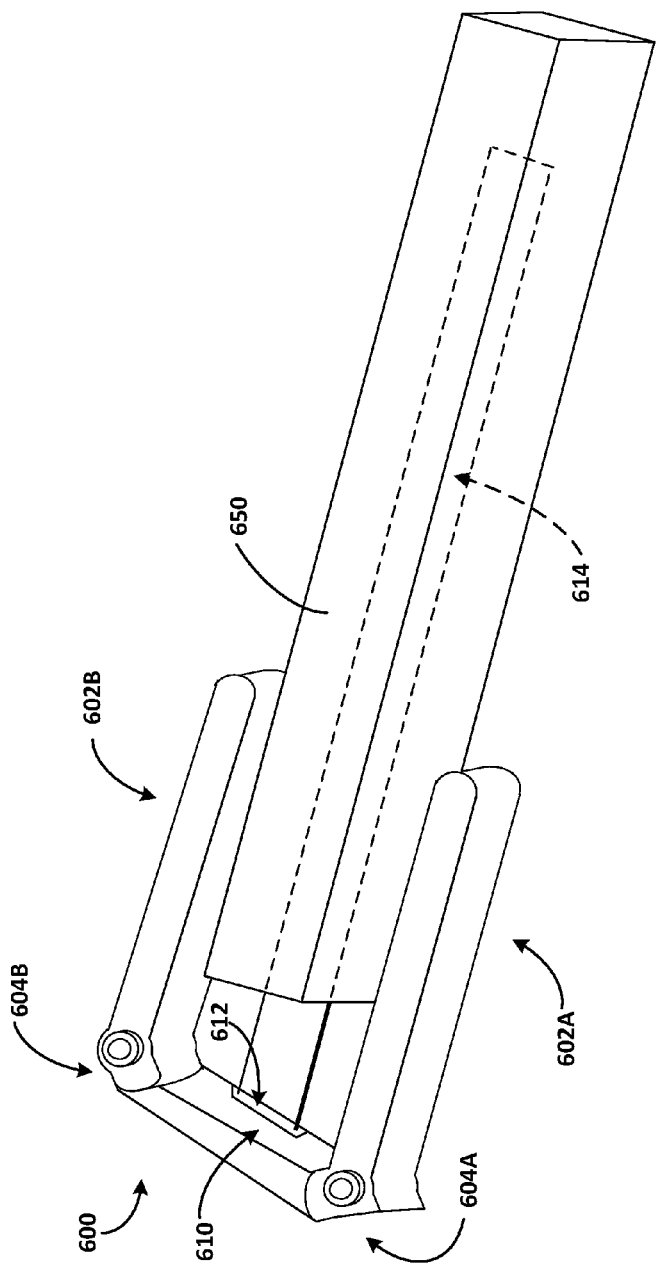
FIG. 6B illustrates the example robotic gripping device of FIG. 6A gripping an object, according to an example embodiment.

FIG. 6B illustrates the robotic gripping device from FIG. 6A grasping an object, according to an example embodiment. More specifically, the gripping device 600 may be positioned so that support member 614 extends below object 650. In some examples, the flat top surface of the support member 614 may be in contact with a bottom surface of the object 650. The fingers 602A-B may then be actuated rotate the fingers 602A-B about rotational joints 604A-B toward the object 650 to grasp two sides of the object 650. The support member 614 may extend under the center of mass of object 650 in order to prevent the object from rotating within the grasp of fingers 602A-B.

In further examples, a shorter support member than the one illustrated in FIG. 6B may be used to prevent the rotation of an object. For instance, in the example where a book is grasped, a short stopper pushing against the book binding may prevent the book from rotating within the grasp of the gripper fingers even though the stopper may not extend beyond the center of mass of the book. This type of shorter support member may be used for certain geometries of objects or in situations where an elongated support member may interfere with the surrounding environment.

In some examples, after object 650 is grasped by gripping device 600 as shown in FIG. 6B, the object 650 may be moved through a trajectory (e.g., by a robotic arm to which the gripping device 600 is attached). In some examples, the trajectory may be determined so that the the support member 614 remains under the object 650 to support the object 650 as it is moved to a drop-off a location. After dropping off the object 650, a robot may detach the support member 614 (e.g., by attaching the support member 614 to a stowage interface or holster at the base of the robot) before performing a next operation with the gripping device 600 that does not require use of the support member 614.

FIGS. 7A, 7B, and 7C illustrate example support member shapes, according to an example embodiment. More specifically, FIGS. 7A, 7B, and 7C illustrate front views of different example elongated support members assuming the support members are oriented so that the longest dimension extends into the page. Different support member shapes may be selected depending on the tasks to be performed by a robot. In some examples, a robot may have access to two or more different interchangeable support members, each of which may be selected to perform different tasks.

FIG. 7A illustrates one example shape of a support member 700. The support member 700 may be a flat, rectangular, relatively thin sheet made of metal or a different material. For example, the support member 700 may have a thickness of 2 or 3 millimeters, a width of 5 centimeters, and a length of 25 centimeters. The relative thinness of the support member 700 may allow the support member 700 to be slid under objects, between objects, or into other tight spaces. The width of the support member 700 may be sufficient to support many object shapes without unnecessarily obstructing movements of the gripper. The length of the support member 700 may be sufficient to provide support to objects that extend well beyond the area of reach of the grippers fingers. The end of the support member 700 which extends away from the gripping device may be rounded, rectangular, forked, or have a different shape. The thickness, width, and length of the support member 700 may all be varied as well.

FIG. 7B illustrates another example shape of a support member 710. The support member 710 includes a first flat piece 712, and a second flat piece 714 connected to and perpendicular to the first flat piece 712. The first flat piece 712 may have the same shape as support member 700 described in reference to FIG. 7A. The second flat piece 714 may be connected to a side of the first flat 712 piece that faces away from the plane of motion of the gripping fingers. Accordingly, the second flat piece 714 may act as a shear wall to support the first flat piece 712 from bending under the weight of a grasped object. The support member 710 may be selected for picking up and moving heavier objects. In another example, the support member may include multiple perpendicular shear walls. For instance a separate shear wall on each side of the support member may be added for increased stiffness.

FIG. 7C illustrates another example shape of a support member 720. The support member 720 includes a flat piece 722, and a connected triangular support structure 724. The flat piece 722 may have the same shape as support member 700 described in reference to FIG. 7A. The triangular support structure 724 may include one or more triangles connected to a side of the first flat 722 piece that faces away from the plane of motion of the gripping fingers. Accordingly, the triangular support structure 724 may provide additional support to the flat piece 722 to prevent the flat piece 722 from bending when supporting an object. In further examples, a different shape such as a "D" shape may be added in cross section instead.

In further examples, the support member may be tapered such that the height of the support member decreases at the distal end of the support member (e.g., the end that is furthest from the gripper when the support member is attached). The tapered tip may be used to nestle the support member into tight spaces to start a manipulation. In other examples, the elongated support member may have a wedge shape (e.g., the height may decrease from the proximal end to the distal end rather than just at the tip). Additionally, the tapered or wedge design may be combined with any of the shapes illustrated in FIGS. 7A-7C. For example, the support member may include a perpendicular shear wall which tapers down to zero height at the distal end.

Other shapes may be used for the elongated support member as well or instead. In some examples, a robot may have access to multiple different support members. For instance, each support member illustrated in FIGS. 7A-7C may be attached at the base of the robot. In particular, the base of the robot may include a stowage interface capable of holding one or more support members when they are not in use by the gripping device. A control system may select among the different support members depending on the object to be grasped or the task to be performed. In one example, the stowage interface may include a vertical slot. The support member may be lowered into the vertical slot. The gripping device may attach the support member by accessing the portion of the support member that extends beyond the vertical slot. In further examples, the stowage interface may be a holster with a click-in interface, such as a magnet. Once in the holster, torque can be applied by the gripping device to release the magnet or other click-in interface. The support member base may include specific features located where the support member is not tapered down that retain the support member and allow click-out. Various types of vertical drop-in type engagements (e.g. round pins) may also be used. Other types of attachment interfaces are also possible.

Figure 8A:
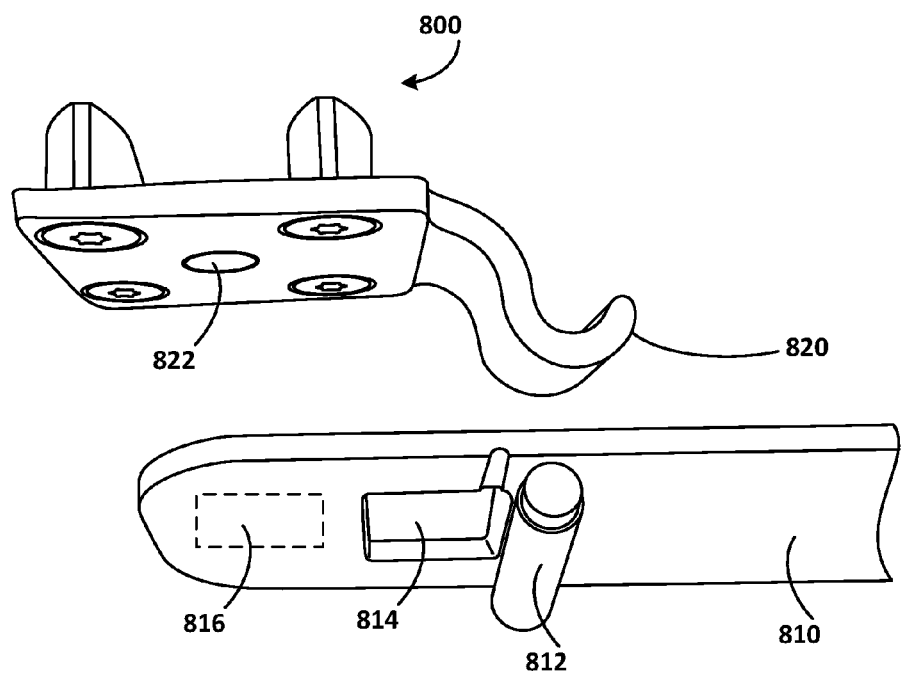
FIGS. 8A and 8B illustrate an example attachment interface, according to an example embodiment.
Figure 8B:
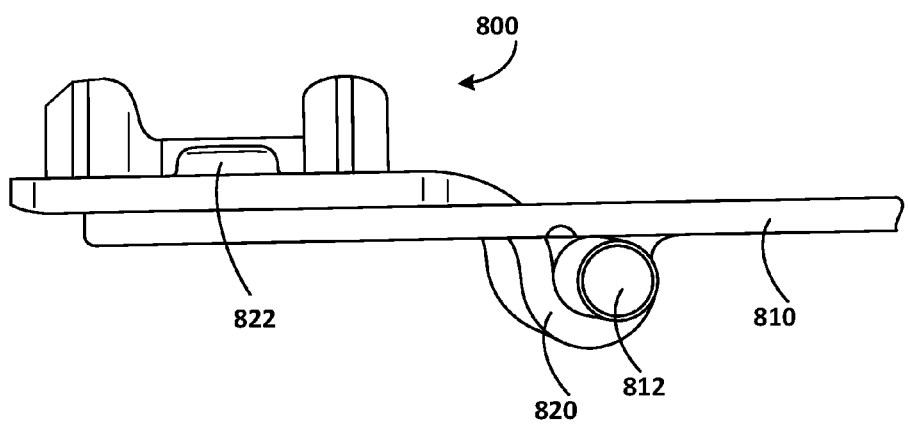

FIGS. 8A and 8B illustrate an example attachment interface, according to an example embodiment. More specifically, FIG. 8A shows an example attachment interface on gripper base 800 before elongated support member 810 is attached to gripper base 800. The attachment interface of the gripper base 800 may include a hook 820. The attachment interface of the gripper base 800 may additionally or alternatively include a magnet 822.

The elongated support member 810 may include a cylindrical rod 812 (such as a dowel pin) and an opening 814 that is adjacent to the rod 812. The support member 810 may additionally include a metal portion 816 (e.g., a thin steel plate) on a top surface of the support member 810 which is opposite the bottom surface to which the rod 812 is attached.

FIG. 8B shows the example attachment interface after the support member has been attached to the gripper base. More specifically, the elongated support member 810 may be coupled to the gripper base 800 by passing the hook 820 through the opening 814, such that the rod 812 fits into the hook 820. In some examples, the metal portion 816 of elongated member 810 may be a magnetic material (or the entire support member 810 may be a magnetic material) such that magnet 822 can provide a force on elongated support member 810. In this way, the attachment interface may provide a more secure connection between the gripper base and the elongated support member.

In another example, a magnet may instead be positioned on a top surface of the elongated support member. The gripper base may then include a metal plate aligned parallel to the plane of motion of the two opposable gripping fingers. The magnet on the elongated support member may couple to the metal plate on the gripper base when the elongated support member mates with the hook component of the gripper base.

In another example, the elongated support member may include multiple rods and corresponding adjacent openings along the length of the support member. The different connection points may allow the robot to select a length for the support member to extend depending on the particular application. For instance, a greater length may be selected to support gripping a large object. In another case, a shorter length may be selected when features in the environment prevent the gripper from being positioned to grasp an object when the support member extends by a greater length from the gripper base.

In a further example, the attachment interface may instead involve a pocket on the gripper base into which the support member fits. The pocket may include a detent latch which fits into a detent recess on the support member to create a nominally retained connection. The robot may then hook the support member onto another component in order to pull the support member out of the pocket on the gripper base to detach the support member.

In a further example, the pocket containing the detent latch may instead be placed on the elongated support member. The attachment interface on the gripper base may then be a separate member having a detent recess that fits into the pocket. The elongated support member may mate with the member having the detect recess by inserting the member having the detect recess into the pocket on the elongated support member such that the detent latch fits into the detent recess.

In other examples, other types of attachment interfaces may be used to couple the support member to the gripper base of gripping device. For instance, the attachment interface may include Velcro or a friction fit. In another example, the attachment interface may involve a quarter turn (e.g., a 90 degree turn) of the support member relative to the gripper base to lock the support member into the gripper base. Other types of attachment interfaces may also be used.

As previously noted, a control system of a robot may determine when to cause the gripping device of the robot to attach the support member. In further examples, the control system may also be configured to provide instructions to cause the robot to perform various types of operations involving the elongated support member.

In one example, the robot may be commanded to first use the support member to create some separation between an object and an adjacent object before causing the gripper to grasp the object. For instance, in order to grasp a box of staples that is stacked next to other boxes of staples on a shelf, the support member may first be used to create separation. In particular, the gripper may be oriented so that the thinnest dimension of the support member is vertical in order to slide the support member between the boxes to push away adjacent boxes from the target box. Enough separation may be created so that the gipping fingers can fit on either side of the box. The gripper may then be reoriented so that the support member extends under the target box and the fingers of the gripper may then be actuated to grasp the sides of the box to lift it off the shelf.

In another example, the support member may be used to press down on an object that is supporting the target object to be grasped between the fingers of the gripper. The support member may in this case stabilize a supporting object or objects to make sure they are not jostled or knocked over during the gripping process. In a further example, the support member may also be used to help separate objects that have some degree of stickiness between them by holding down one object while the gripper fingers grab another object and move it away. For instance, the support member may be preloaded to bend the support member by pressing down on a first object. The gripper fingers may then grasp a second object. The gripping device may then be lifted while the support member is still pressing down on the first object until the gripping device is moved far enough that the preload is relieved.

In a further example, an object such as a box may first be slid past the edge of a supporting surface like a table using the fingers of the gripper. This operation may cause a portion of the box to extend past the edge of the table to allow the support member to easily fit under the box without having to be inserted in between the box and the table. After sliding the object past the edge of the supporting surface, the elongated support member may be attached to the gripping device and positioned under the portion of the object that extends past the edge of the supporting surface. Such a gripping process may also involve iteratively inserting the support member further under the object and then sliding the object further past the edge of the table with the fingers of the gripper until the object is fully supported by the support member and gripping fingers.

In another example, the support member may be configured to pick up some types of objects without the use of the gripping fingers. In particular, the support member may include an electrostatic pad that may be pressed down on an object like a business card to pick up a business card or a credit card. The electrostatic pad may allow the support member to be used to pick up flat objects that are difficult for the opposable gripping fingers to grasp.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A method comprising:
   identifying an object for a robotic gripping device to grasp, wherein the robotic gripping device comprises two opposable gripping fingers that are configured to move towards and away from each other within a plane of motion;
   determining, based on one or more characteristics of the identified object, to attach an elongated support member to an attachment interface on a gripper base of the robotic gripping device before grasping the identified object;
   causing the robotic gripping device to attach the elongated support member to the attachment interface on the gripper base of the robotic gripping device, wherein the attached elongated support member extends parallel to the plane of motion of the two opposable gripping fingers;

positioning the robotic gripping device such that the identified object is between the two opposable gripping fingers and the elongated support member is beneath the identified object; and after positioning the robotic gripping device, actuating the two opposable gripping fingers to grasp the identified object.

2. The method of claim 1, further comprising:

determining a shape of the identified object;

determining, based on the shape of the identified object, that a center of mass of the identified object is expected to extend beyond the opposable gripping fingers by more than a threshold distance when the opposable gripping fingers grasp the identified object; and based on determining that the center of mass of the identified object is expected to extend beyond the opposable gripping fingers by more than the threshold distance, determining to attach the elongated support member to the attachment interface on the gripper base of the robotic gripping device before actuating the opposable gripping fingers to grasp the identified object.

3. The method of claim 1, further comprising:

determining a shape of the identified object;

determining, based on the shape of the identified object, that a center of mass of the identified object is expected to be located within a threshold distance from fingertips of the opposable gripping fingers when the opposable gripping fingers grasp the identified object; and based on determining that the center of mass of the identified object is expected to be located within the threshold distance from the fingertips of the opposable gripping fingers, determining to attach the elongated support member to the attachment interface on the gripper base of the robotic gripping device before actuating the opposable gripping fingers to grasp the identified object.

4. The method of claim 1, further comprising:

causing the opposable gripping fingers to grasp the object at a first time when the elongated support member is not attached to the attachment interface on the gripper base of the robotic gripping device;

determining that the object is rotating or slipping when grasped by the opposable gripping fingers at the first time;

based on determining that the object is rotating or slipping, causing the opposable gripping fingers to release the object;

after causing the opposable gripping fingers to release the object, subsequently causing the robotic gripping device to attach the elongated support member to the attachment interface on the gripper base of the robotic gripping device; and causing the opposable gripping fingers to grasp the object at a later second time when the elongated support member is attached to the attachment interface on the gripper base of the robotic gripping device.

5. The method of claim 1, further comprising:

causing the opposable gripping fingers to slide the object along a support surface until a portion of the object extends past the support surface;

after causing the opposable gripping fingers to slide the object along the support surface, subsequently causing the robotic gripping device to attach the elongated support member to the attachment interface on the gripper base of the robotic gripping device;

positioning the robotic gripping device such that the elongated support member is under the portion of the object that extends past the support surface; and after positioning the robotic gripping device such that the elongated support member is under the portion of the object that extends past the support surface, causing the opposable gripping fingers to grasp the object.

6. The method of claim 1, further comprising:

identifying an adjacent object that is adjacent to the object;

determining, based on a proximity of the adjacent object to the object, to attach the elongated support member to the attachment interface on the gripper base of the robotic gripping device before grasping the identified object;

positioning the robotic gripping device such that the elongated support member is inserted between the object and the adjacent object; and moving the robotic gripping device in order to cause the elongated support member to move at least one of the object and the adjacent object to increase an amount of separation between the object and the adjacent object before actuating the two opposable gripping fingers to grasp the object.

7. The method of claim 1, further comprising:

identifying a supporting object on which the object is resting;

positioning the robotic gripping device such that the elongated support member is inserted between the object and the supporting object; and moving the robotic gripping device in order to cause the elongated support member to press down on the supporting object before actuating the two opposable gripping fingers to grasp the object.

8. The method of claim 1, further comprising:

selecting the elongated support member from a plurality of elongated support members based on the one or more characteristics of the identified object, wherein each of the plurality of elongated support members has a different shape.

9. A non-transitory computer readable medium having stored therein instructions, that when executed by at least one processor, cause the at least one processor to perform functions comprising:

identifying an object for a robotic gripping device to grasp, wherein the robotic gripping device comprises two opposable gripping fingers that are configured to move towards and away from each other within a plane of motion;

determining, based on one or more characteristics of the identified object, to attach an elongated support member to an attachment interface on a gripper base of the robotic gripping device before grasping the identified object;

causing the robotic gripping device to attach the elongated support member to the attachment interface on the gripper base of the robotic gripping device, wherein the attached elongated support member extends parallel to the plane of motion of the two opposable gripping fingers;

positioning the robotic gripping device such that the identified object is between the two opposable gripping fingers and the elongated support member is beneath the identified object; and after positioning the robotic gripping device, actuating the two opposable gripping fingers to grasp the identified object.

10. A system, comprising:
a robotic gripping device;
an elongated support member;
at least one processor; and
a non-transitory computer readable medium having stored therein instructions, that when executed by the at least one processor, cause the at least one processor to perform functions comprising:
identifying an object for the robotic gripping device to grasp, wherein the robotic gripping device comprises two opposable gripping fingers that are configured to move towards and away from each other within a plane of motion;
determining, based on one or more characteristics of the identified object, to attach the elongated support member to an attachment interface on a gripper base of the robotic gripping device before grasping the identified object;
causing the robotic gripping device to attach the elongated support member to the attachment interface on the gripper base of the robotic gripping device, wherein the attached elongated support member extends parallel to the plane of motion of the two opposable gripping fingers;
positioning the robotic gripping device such that the identified object is between the two opposable gripping fingers and the elongated support member is beneath the identified object; and
after positioning the robotic gripping device, actuating the two opposable gripping fingers to grasp the identified object.

11. The system of claim 10, wherein the elongated support member is an unactuated component.

12. The system of claim 10, wherein a longest side of the elongated support member bisects an angle between the two opposable gripping fingers when the elongated support member is attached to the attachment interface of the gripper base.

13. The system of claim 10, wherein the elongated support member comprises a flat planar surface that extends parallel to the plane of motion of the two opposable gripping fingers.

14. The system of claim 10, wherein the elongated support member comprises:
a first planar surface that extends parallel to the plane of motion of the two opposable gripping fingers; and
a second planar surface connected to the first planar surface such that the second planar surface is arranged perpendicular to the first planar surface along a side of the first planar surface that faces away from the plane of motion of the two opposable gripping fingers.

15. The system of claim 10, wherein the elongated support member is tapered such that a height of the elongated support member decreases at a distal end of the elongated support member.

16. The system of claim 10, wherein the elongated support member comprises:
a planar surface that extends parallel to the plane of motion of the two opposable gripping fingers; and
an electrostatic pad positioned on a side of the planar surface that faces away from the plane of motion of the two opposable gripping fingers.

17. The system of claim 10, wherein:
the attachment interface on the gripper base comprises a hook component; and
the elongated support member comprises an opening and a rod, wherein the elongated support member mates with the hook component by passing the hook component through the opening such that the rod rests on the hook component.

18. The system of claim 17, wherein:
the rod is positioned on a bottom surface of the elongated support member;
the elongated support member comprises a metal plate positioned on a top surface of the elongated support member; and
the gripper base further comprises a magnet aligned parallel to the plane of motion of the two opposable gripping fingers, wherein the magnet of the gripper base couples to the metal plate of the elongated support member when the elongated support member mates with the hook component of the gripper base.

19. The system of claim 17, wherein:
the rod is positioned on a bottom surface of the elongated support member;
the elongated support member comprises a magnet positioned on a top surface of the elongated support member; and
the gripper base further comprises a metal plate aligned parallel to the plane of motion of the two opposable gripping fingers, wherein the metal plate of the gripper base couples to the magnet of the elongated support member when the elongated support member mates with the hook component of the gripper base.

20. The system of claim 10, wherein:
the attachment interface on the gripper base comprises a hook component; and
the elongated support member comprises a plurality of openings at different lengths of the elongated support member and a plurality of rods corresponding to the plurality of openings, wherein the elongated support member mates with the hook component by passing the hook component through a particular opening of the plurality of openings such that the corresponding rod rests on the hook component.

21. The system of claim 10, wherein:
the attachment interface on the gripper base comprises a pocket containing a detent latch; and
the elongated support member comprises a detent recess, wherein the elongated support member mates with the pocket by inserting the elongated support member into the pocket on the gripper base such that the detent latch fits into the detent recess.

22. The system of claim 10, wherein:
the elongated support member comprises a pocket containing a detent latch; and
the attachment interface on the gripper base comprises a member having a detent recess, wherein the elongated support member mates with the member having the detent recess by inserting the member having the detent recess into the pocket on the elongated support member such that the detent latch fits into the detent recess.

* * * * *